United States Patent
Mukherjee et al.

(10) Patent No.: US 10,879,534 B2
(45) Date of Patent: Dec. 29, 2020

(54) POROUS GRAPHENE NETWORK ELECTRODES AND AN ALL-CARBON LITHIUM ION BATTERY CONTAINING THE SAME

(71) Applicant: Rensselaer Polytechnic Institute, Troy, NY (US)

(72) Inventors: Rahul Mukherjee, Troy, NY (US); Nikhil Koratkar, Clifton Park, NY (US); Eklavya Singh, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 538 days.

(21) Appl. No.: 15/110,199

(22) PCT Filed: Dec. 11, 2014

(86) PCT No.: PCT/US2014/069718
§ 371 (c)(1),
(2) Date: Jul. 7, 2016

(87) PCT Pub. No.: WO2015/089272
PCT Pub. Date: Jun. 18, 2015

(65) Prior Publication Data
US 2017/0047588 A1  Feb. 16, 2017

Related U.S. Application Data

(60) Provisional application No. 61/915,030, filed on Dec. 12, 2013.

(51) Int. Cl.
*H01M 4/587* (2010.01)
*C25D 17/00* (2006.01)
(Continued)

(52) U.S. Cl.
CPC ........... *H01M 4/587* (2013.01); *C01B 32/184* (2017.08); *C01B 32/194* (2017.08); *C01B 32/23* (2017.08);
(Continued)

(58) Field of Classification Search
CPC ...... B65G 49/02; C25D 17/002; C25D 17/28; C25D 17/22; C25D 13/04; C25D 13/02;
(Continued)

(56) References Cited

U.S. PATENT DOCUMENTS

2010/0266964 A1* 10/2010 Gilje .................. B82Y 30/00
430/322
2010/0303706 A1* 12/2010 Wallace ............... B82Y 30/00
423/445 B
(Continued)

FOREIGN PATENT DOCUMENTS

CN     102051651 A    5/2011
KR  10-2013-0044676    5/2013
(Continued)

OTHER PUBLICATIONS

Dhawle et al., "Hydrophilic polyaniline nanofibrous architecture using electrosynthesis method for supercapacitor application," Oct. 29, 2009, Current Applied Physics, 10, 904-909. (Year: 2009).*
(Continued)

*Primary Examiner* — Ula C Ruddock
*Assistant Examiner* — Matthew W Van Oudenaren
(74) *Attorney, Agent, or Firm* — Murtha Cullina LLP; Anthony P. Gangemi

(57) ABSTRACT

Systems for the production of graphene oxide sheets are provided. The systems include electro-deposition and spray deposition techniques. The graphene oxide sheets may be used as pre-cursors for the formation of porous graphene network (PGN) anodes and lithiated porous graphene (Li-
(Continued)

PGN) cathodes. The method of making PGN electrodes includes thermally reducing a pre-cursor sheet of graphene oxide to provide a PGN anode and exposing the sheet to lithium or a lithium-containing compound to produce a Li-PGN cathode. The Li-PGN cathode and PGN anode may be combined with an electrolyte to provide an "all-carbon" battery that is useful in various applications, such as automotive applications.

6 Claims, 14 Drawing Sheets

(51) Int. Cl.
  *C25D 9/04* (2006.01)
  *H01M 10/0525* (2010.01)
  *H01M 4/04* (2006.01)
  *C01B 32/194* (2017.01)
  *C01B 32/184* (2017.01)
  *C01B 32/23* (2017.01)
  *H01M 4/02* (2006.01)

(52) U.S. Cl.
  CPC ............... *C25D 9/04* (2013.01); *C25D 17/00* (2013.01); *H01M 4/0452* (2013.01); *H01M 4/0471* (2013.01); *H01M 10/0525* (2013.01); *C01P 2006/40* (2013.01); *H01M 2004/021* (2013.01); *H01M 2220/20* (2013.01)

(58) Field of Classification Search
  CPC ...... C25D 13/22; C25D 32/192; C25D 32/23; C25D 5/18; C25D 9/04; C25D 17/00; H01M 4/587; H01M 4/0452; H01M 4/0471; H01M 4/133; H01M 10/0525; H01M 2004/021; H01M 2220/20; C01B 32/194; C01B 32/184; C01B 32/23; C01B 32/182; C01P 2006/40
  See application file for complete search history.

(56) References Cited

U.S. PATENT DOCUMENTS

| | | | | |
|---|---|---|---|---|
| 2011/0079748 | A1* | 4/2011 | Ruoff | C01B 32/194 252/62.2 |
| 2011/0227000 | A1* | 9/2011 | Ruoff | B82Y 30/00 252/502 |
| 2011/0256014 | A1* | 10/2011 | Hong | C22C 26/00 419/11 |
| 2012/0012461 | A1* | 1/2012 | Kruglick | C25D 13/02 204/456 |
| 2012/0068122 | A1* | 3/2012 | Kranbuehl | C08J 5/005 252/503 |
| 2013/0045427 | A1 | 2/2013 | Zhamu et al. | |
| 2013/0258552 | A1 | 10/2013 | Choi et al. | |
| 2013/0266859 | A1 | 10/2013 | Todoriki et al. | |
| 2013/0271085 | A1 | 10/2013 | Chen et al. | |
| 2014/0037963 | A1* | 2/2014 | Song | B82Y 30/00 428/408 |
| 2014/0339085 | A1* | 11/2014 | Bouyer | C25D 13/02 204/509 |

FOREIGN PATENT DOCUMENTS

| | | | |
|---|---|---|---|
| WO | 2011116369 | A2 | 9/2011 |
| WO | 2012137156 | A1 | 10/2012 |
| WO | WO2012134205 | * | 10/2012 |
| WO | WO2013064776 | * | 5/2013 |

OTHER PUBLICATIONS

Herlem et al., "Electrodeposition of Insulating Thin Film Polymers from Aliphatic Monomers as Transducers for Biosensor Applications," Jul. 18, 2011, Biosensors—Emerging Materials and Applications. (Year: 2011).*
Hasan et al., "Transferable Graphene Oxide Films with Tunable Microstructures," 2010, Nano, vol. 4, No. 12, 7367-7372. (Year: 2010).*
Huang et al., "Electrophoretic deposition and thermal annealing of a graphene oxide thin film on carbon fiber surfaces," Available online Oct. 2012, Carbon, 52, 605-620. (Year: 2012).*
Database WPI Thomson Scientific, Week 201154, AN 2011-G64783, XP002769380, May 11, 2011, 1 page.
Wu, M.S., et al., "Formation of nano-scaled crevices and spacers in NiO-attached graphene oxide nanosheets for supercapacitors," 2012, pp. 2442-2448, vol. 22(6), Journal of Materials Chemistry.
Partial Supplementary European Search Report for European Application No. 14869328.6, dated May 15, 2017, 15 pages.
Chinese Office Action issued in Chinese Application No. 201480072985.7, dated Jun. 15, 2017, including English translation, 13 pages.
Supplementary European Search Report issued in Application No. 14869328.6, dated Aug. 21, 2017, 12 pages.
International Search Report issued in PCT/US2014/069718 dated Jun. 29, 2015.

* cited by examiner

POROUS GRAPHENE NETWORK ELECTRODES AND AN ALL-CARBON LITHIUM ION BATTERY CONTAINING THE SAME

CROSS-REFERENCE TO RELATED APPLICATIONS

This application is the U.S. National Phase Application of PCT/US2014/069718, filed Dec. 11, 2014, which claims priority to U.S. Provisional Application No. 61/915,030 filed on Dec. 12, 2013, the contents of which are incorporated herein in its entirety.

FIELD OF THE INVENTION

The invention relates to electrode materials containing graphene and methods of manufacturing the materials that may be incorporated into commercial applications, such as rechargeable batteries.

BACKGROUND OF THE INVENTION

The global market for lithium ion batteries was $11.7 billion in 2012 and is expected to double by 2016 to an estimated $22.5 billion. While lithium-ion batteries are already ubiquitous in consumer electronics, new and emerging markets, specifically those of electric vehicles, have also found an ideal solution in next generation lithium ion batteries as the primary energy storage mechanism. The success of lithium ion batteries has greatly been attributed to its high energy density of ~200 Wh/kg, far surpassing other energy storage devices including nickel cadmium, nickel metal hydride, and lead acid batteries. The term "energy density" translates to longer operational times on a single charge and hence on this account, lithium ion batteries have been considered ideal for consumer electronics, as well as electric vehicles and grid storage.

However, lithium ion batteries exhibit a significant limitation in terms of their power density. In general, lithium ion batteries deliver power densities of ~100 W/kg, which is two to three orders of magnitude lower than super-capacitors and three orders of magnitude lower than combustion engines. Since power density translates to how quickly a battery can deliver power to a device, this limitation significantly affects the successful and large-scale incorporation of lithium ion batteries in electric vehicles. In fact, electric vehicles are often equipped with additional super-capacitors that provide the necessary power boost during events such as acceleration and regenerative braking. Such a battery/super-capacitor system not only makes the design of the energy storage system complicated, but also contributes towards increased cost and maintenance. Moreover, in order to make electric vehicles a feasible alternative, it is also of utmost necessity that the energy density of such batteries be increased further to provide sufficient mileage on a single charge, capable of comparison with conventional internal combustion engines. In general, as the demand for an efficient solution for the impending energy crisis continues to rise, it is incumbent upon the battery community to identify and develop a superior lithium-ion battery that can boost its adoption across various sectors including automotive and grid storage, as well as portable electronics.

SUMMARY OF THE INVENTION

According to a first embodiment of the present invention, a system for the production of graphene oxide sheets is provided. The system comprises a counter electrode and a working electrode immersed in a bath, the bath containing a dispersion of graphene oxide, a substrate applied to a surface of the counter electrode, and a source of electricity configured to apply a current between the counter electrode and the working electrode capable of electrolytically depositing the graphene oxide in the bath onto the substrate.

In another embodiment of a system according to the present invention, the system comprises a heated substrate, a dispersion of graphene oxide, and a spray nozzle configured to spray the dispersion of graphene oxide onto the heated substrate.

According to another embodiment of the present invention, a lithiated porous graphene network (Li PGN) cathode is provided and a method for making the same. The Li PGN cathode comprises a sheet of graphene, the graphene being intercalated with lithium metal. The method comprises thermally reducing a sheet of graphene oxide to produce a sheet of graphene and exposing the sheet of graphene to lithium or a lithium-containing compound to produce the Li PGN cathode. The Li PGN cathode may be combined with a PGN anode and an electrolyte to provide an "all-carbon" battery that may be useful in various applications, like automotive applications, for example.

DETAILED DESCRIPTION OF THE INVENTION

Figure 1A:
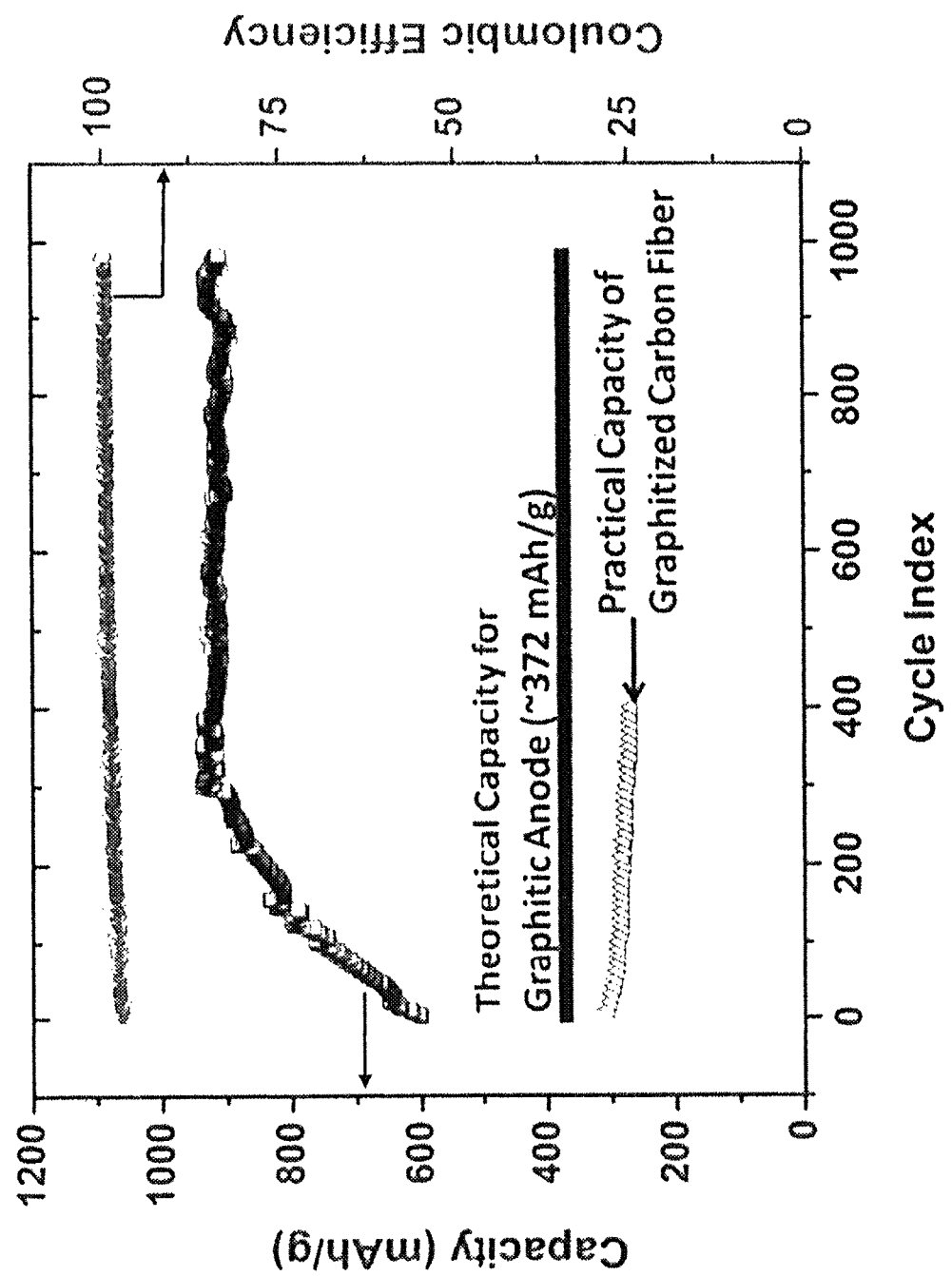
FIG. 1(A) is the capacity and coulombic efficiency vs. cycle index of an anode according to an embodiment of the present invention compared to the theoretical and practical capacity of a graphitic anode.

According to one embodiment of the present invention, an electro-deposition technique is provided for the manufacture of graphene oxide on an industrial (extremely large-scale) level. The deposition technique and parameters may reduce synthesis time and increase through-put, thereby ensuring economical manufacturing of graphene and/or graphene oxide free-standing sheets. The process may in further include the deposition of graphene oxide and/or graphene directly onto pre-determined substrates, which is useful for coating graphene and/or graphene oxide for a variety of applications, such as coating metals to prevent corrosion or to provide an insulating (graphene oxide) layer on conductive substrates, for example. Thus, electro-deposition methods according to the present invention may be applied where either (a) a graphene oxide passivating and/or insulating coating is required on a conductive substrate or (b) a conductive graphene sheet is required that increases the surface area and/or enhances electron transport kinetics and/or improves the electrochemical reaction efficiencies within a system. The process may further include a reduction method to yield graphene free-standing sheets from as-deposited graphene oxide sheets. The sheets may be used as starting materials for products, such as electrodes, for example. Finally, a roll-to-roll automation strategy may be implemented with the electro-deposition process for the synthesis of graphene oxide and/or graphene sheets.

Conventionally graphene is synthesized via vacuum filtration of graphene oxide followed by reduction of the graphene oxide. In this process a solution of graphene oxide is dispersed in DI water and filtered through a porous Anodisc membrane. However, as the graphene oxide sheets continue to get deposited on the Anodisc membrane, the pressure drop across the filter increases resulting in a rapid decrease in the rate of deposition. Generally, vacuum filtration is a process that is extremely slow (taking up to 3-4 days to create a free-standing sheet roughly 17 cm$^2$ in area and 20 μm thick) and non-scalable (the mass loading is generally between 0.01-0.1 mg/cm$^2$). In order to provide a commercially feasible method of manufacturing graphene oxide, it is therefore essential to ensure a scalable synthesis and reduction process that can provide large area graphene sheets (>10 cm$^2$) that are significantly thicker (>20 microns) and with a higher mass loading (>0.1 mg/cm$^2$) at higher rates of production to meet the potential demands for the material.

According to a first system according to the present invention, graphene oxide sheets may be synthesized by an electro-deposition process whereby an current is applied between a counter electrode made from stainless steel or titanium mesh, for example, and a working electrode comprising a flattened sheet, preferably made from aluminum. The counter electrode and the working electrode are preferably immersed in an aqueous dispersion bath comprising the graphene oxide. Preferably, the working electrode is formed into a sheet with minimum perturbations to prevent the formation of air pockets. The system may further comprise a mildly hydrophilic porous polymer membrane, such as polypropylene, cellulose ester, or PTFE, applied to an external surface of the aluminum sheet. Alternatively, the working electrode may be comprised only of a conductive substrate such as stainless steel, copper, aluminum and carbon. A voltage applied between the electrodes may cause the graphene oxide to flow towards the working electrode where the graphene oxide gets trapped at the polymer membrane. The voltage may be at least 2 V, preferably about 2 to 10 V. Increasing the voltage will increase the rate of deposition, thereby decreasing processing time; however, increased voltage will consume more energy adding to the operating cost of the system. The incremental increase in deposition rate may not justify the energy cost. Once the required deposition is complete, the working electrode and polymer membrane configuration may be removed from the bath and dried, preferably at room temperature. Drying time may last approximately 6 hours. The drying process may be further accelerated through carrying out the step in a vacuum furnace maintained between 30-70° C., allowing the drying process to be completed within 1-2 hours. At the end of the drying stage, the graphene oxide sheet may be simply peeled off the polymer membrane to obtain a free-standing graphene oxide electrode pre-cursor.

Figure 5:
FIG. 5 is an SEM image of graphene oxide directly deposited onto conductive carbon felt substrate using an electro-deposition technique according to the present invention.

An SEM image of a graphene oxide sheet made by an electro-deposition process according to the present invention is provided as FIG. 5. The process, as described above was employed, except that in place of a mildly hydrophilic polymer substrate, graphene oxide in this case was deposited directly on carbon felt, which acted as the working electrode assembly.

Figure 6:
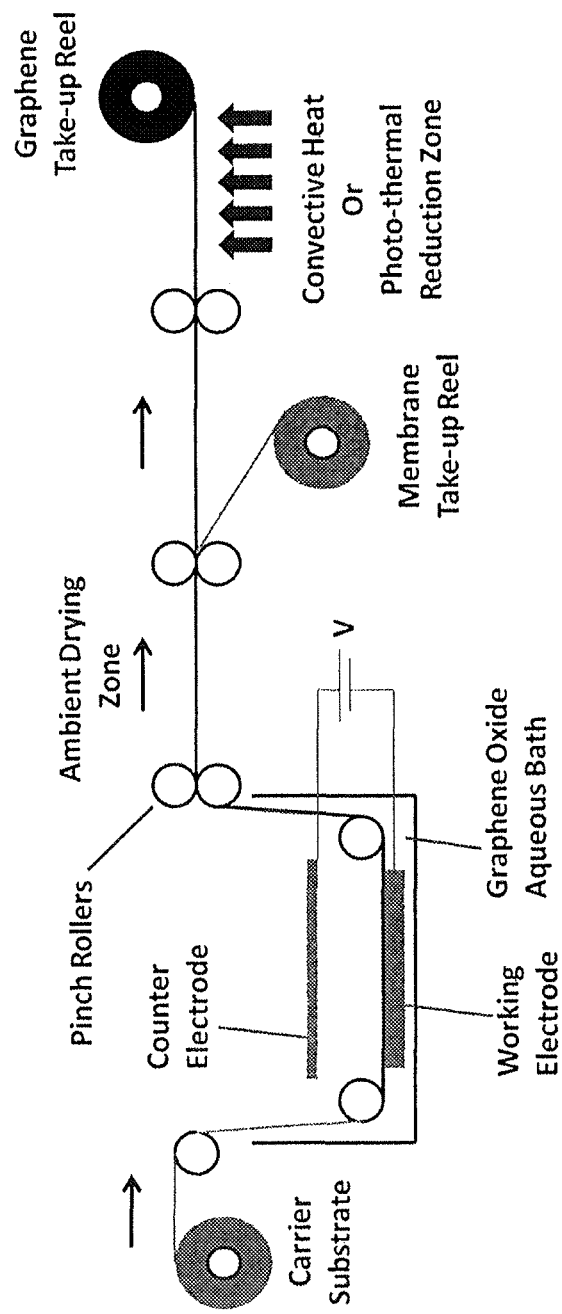
FIG. 6 is a schematic of a roll-to-roll electro-deposition assembly according to another embodiment of the present invention.

In a second embodiment of a system according to the present invention, a roll-to-roll electro-deposition strategy has been developed. Referring to the schematic of FIG. 6, this embodiment may include a carrier substrate in the form of a polymer membrane at the beginning of the deposition line that travels through a deposition bath comprising the graphene oxide aqueous dispersion. The membrane substrate is slidably applied to the surface of a working electrode and may be advanced and held in place via a plurality of rollers. As the polymer membrane passes through the bath, the electro-deposition process, similar to the first embodiment, may be carried out, and graphene oxide may be deposited directly onto the polymer membrane. Upon obtaining a pre-determined target thickness of graphene oxide coverage, the membrane is then advanced out of the bath and may be passed through a pair of pinch rollers that squeeze out excess water and permit faster drying of the sheets. The membrane is then advanced to an ambient drying zone in which exposure to ambient air dries the deposited graphene oxide web. Alternatively, heated air may be provided to the drying zone by, for example, delivering air through a heating means, such as a hot plate or other heat exchanger. The elevated temperature of the drying zone is preferably maintained at 40-50° C. Once dried, the graphene oxide web may optionally pass through another set of pinch rollers to remove remaining traces of water after which the polymer membrane and graphene oxide sheets may be separated. Upon separation, the polymer membrane may be wound on a membrane take-up reel while the graphene oxide web is directed to a reduction stage. At the reduction stage, the graphene oxide is reduced using thermal or photo-thermal reduction in more detail below to convert the web to graphene. The resulting graphene web may be finally directed to a graphene take-up reel. All or a portion of the roll-to-roll electro-deposition process may be automated to provide a continuous cost-effective process by reducing man-power and increasing through-put.

In a third embodiment of a system according to the present invention, the graphene oxide pre-cursor may be synthesized by ultrasonic spray deposition. A substrate similar to the mildly hydrophilic polymer membrane as discussed above, for example, may be applied to a porous plate. Means for holding the substrate in place may preferably include vacuum suction to prevent the formation of air pockets between the plate and the polymer membrane. The substrate may be maintained at an elevated temperature of 20 to 100° C., preferably about 50 to 70° C., to enable rapid drying. Graphene oxide dispersed in a carrier fluid, such as ethanol or water, may be sprayed directly onto the substrate using, for example, a 120 kHz impact nozzle. The substrate maintains a relatively fixed position while the nozzle is preferably programmed to cover the entire substrate area for uniform deposition. The rate of production would therefore be easily scalable and controlled by the area of the substrate, the thickness of the each layer applied per pass, the volumetric flow rate of the spray nozzle, and the necessary dwell time between passes to allow each sprayed layer to dry based on the volatility of the carrier fluid and drying temperature. In a preferred embodiment of the spray deposition technique, a scalable graphene oxide may be synthesized having a 20 to 50 micron cross-sectional thickness. The resulting material may be used as an electrode pre-cursor that is subsequently reduced to graphene. Multiple passes of the nozzle (coating cycle) may be carried out to achieve the desired thickness. A single coating cycle preferably lasts about 60-120 seconds. At the end of every single coating cycle, a 5-10 seconds dwell time may be incorporated to facilitate drying of the as-deposited graphene oxide.

According to another embodiment of the present invention, a type of super-capacitor battery is disclosed, i.e. a set of materials that can deliver higher power densities while maintaining excellent energy densities that may be especially relevant for hybrid electric vehicles for which large battery packs heretofore have been unable to provide enough power density for acceleration. Other embodiments of the present invention provide a super-capacitor battery that may be integrated with regenerative braking systems, which involves recharging the batteries at a very high rate, and may provide a potential comprehensive solution for the transportation industry. Super-capacitory batteries according to some embodiments of the present invention may include convective heat-reduced graphene-based anodes and convective heat-reduced pre-lithiated graphene cathodes.

Conventionally, the anode in a lithium ion battery is graphite while the cathode comprises a lithium-based composite such as lithium cobalt oxide or lithium iron phosphate. In contrast, electrodes according to various embodiments of the present invention may comprise graphene as the anode and a lithium-graphene composite as the cathode. According to other embodiments of the present invention, a method of manufacturing anodes and cathodes may include an electro-deposition based approach to synthesize the electrodes quickly, economically, and in large quantities. The combination of a rapid, yet simple synthesis technique and the unique material properties offered by both the anodes and cathodes according to the embodiments of the present invention, may allow the realization of a high performance, inexpensive "all-carbon" lithium ion battery that may potentially pave the way towards next generation lithium ion batteries for sectors ranging from automotive, grid storage, as well as portable electronics.

It has been found that some embodiments of the graphene anodes made according to the present invention may provide a larger reversible storage of lithium ions, translating to an energy density of as high as about 600 Wh/kg, 4-fold higher than conventional electrodes. Furthermore, the high electrical conductivity of the graphene in the various embodiments of the electrodes according to the present invention may exhibit a very high porosity, ensuring rapid lithium-ion transfer kinetics which in turn results in a power density as high as about 30 kW/kg, which is 2-orders of magnitude higher than commercial lithium ion battery electrodes.

Graphene electrodes made according to the present invention may also exhibit structural robustness and electrochemical stability. Thus, various embodiments of the present invention may provide graphene electrodes having excellent longevity with thousands of cycles of continuous charge/discharge with excellent retention in capacity. In some embodiments, the graphene electrodes may be in the form of free-standing paper-like structures and eliminate the need for non-conductive polymer binders and conductive additives that are used in commercial anodes and cathodes. Not only does this reduce the cost of the electrodes, but it may also assist in retention of superior performance characteristics due to the elimination of non-active materials in the electrode structure.

It has also been found that cathodes comprising lithium-graphene composites according to the present invention may offer several significant advantages over commercial cathodes, such as lithium cobalt oxide or lithium iron phosphate. First of all, the use of fewer constituents in the host material for the cathode ensures the availability of maximum gravimetric concentration of lithium ions. In certain embodiments of the present invention, this may translate to an exceptionally high energy density in excess of about 630 Wh/kg and an achievable capacity of 850 mAh/g. The working voltage of about 0.75V for certain embodiments of the present invention is significantly lower than conventional lithium ion battery cathodes and may allow the use of aqueous electrolytes in batteries containing the inventive cathodes thereby further lowering the cost of the battery and eliminating the need for more toxic electrolytes. Finally, lithium-graphene cathodes according to embodiments of the present invention may consist essentially of lithium metal and graphene and exclude expensive rare-earth and toxic metals such as cobalt, thereby providing a safer product and reducing the cost of the cathodes considerably.

According to an embodiment of the present invention, synthesis of a free-standing (binder-free), porous graphene network (PGN) electrode may be obtained by exposing pre-cursor graphene oxide paper to convective heat. The pre-cursor graphene oxide paper may be obtained by one of the scalable synthesis processes described above. Exposure to convective heat may be achieved, for example, by placing graphene oxide paper at a height of about 2 to 5 cm over a flame or heating the pre-cursor paper in a convection oven. Convective heat treatment may initiate a rapid deoxygenation reaction that allows for the reduction of graphene oxide to graphene, while inducing micron-scale cracks and nano-scale pores within the structure with an average pore size diameter between 25 and 85 nanometers. Preferably, convective heat reduction may be carried out by exposing the pre-cursor graphene oxide paper to a gas lighter or Bunsen burner flame, while maintaining a distance of about 2 to 5 cm from the flame. The flame temperature may vary between 700 and 1200° C. and the reduction of graphene oxide is generally instantaneous. It was found that convective heat reduction may allow for exceptional retention of structural integrity while allowing for scalability of the electrodes.

Rapid and intensive reduction techniques are less preferred due to the potential for structural degradation. Moreover, such reduction methods generally result in poor heat penetration, leading to only partial reduction of thicker graphene oxide papers, exceeding 50 microns in cross-sectional thickness. However, it was found that convective heat reduction may overcome both of these limitations. While not wishing to be bound by theory, it is believed that thermal conductivity of graphene contributes to the advantages of the convective heat reduction methods of the present invention. As graphene oxide paper is exposed to a heat source, the initial few layers are reduced to graphene. Graphene, which has exceptional thermal conductivities, then may allow for the transfer of the heat to the inner sheets of graphene oxide. This gradual progression of heat allows for both a uniform reduction and retention in structural integrity.

According to a first embodiment of a synthesis method for the production of lithium-porous graphene network (Li-PGN) cathodes according to the present invention, a pre-cursor PGN may be treated with lithium or a lithium containing compound, such as n-butyllithium, to induce chemical lithiation. In a second embodiment of a synthesis method for the production of Li-PGN cathodes, PGN based cathodes may be synthesized by cycling a photo-thermal or convective heat-reduced PGN anodic half-cell to initiate natural intercalation and lithium metal plating steps upon exposure to a lithium or lithium containing compound. In a third embodiment, lithium insertion may be achieved through electrochemical methods by applying a voltage between the pre-cursor graphene and a lithium-containing counter-electrode, such as lithium cobalt oxide, lithium iron phosphate, lithium and lithium halides, or between the pre-cursor graphene and a metal foil counter-electrode immersed in an electrolyte containing lithium salts, such as lithium halides, lithium hexafluorophosphates and lithium perchlorates.

Photo-thermal (or flash) reduction may be performed by exposing a PGN based anode to xenon flash tubes or a laser. In a preferred embodiment, a controllable studio xenon flash, such as an Einstein™ E640 Flash Unit manufactured by Paul C. Buff, Inc. of Nashville, Tenn., may be used at a very high energy. The energy intensity of the flash may be at least about 150 Ws, preferably at least about 320 Ws, and at most about 400 Ws to induce wider pore formation and greater density of defect sites. A single flash may be sufficient for energy intensities greater than 200 Ws. At energy intensities between 150 and 200 Ws, two flashes may be required. Because of the greater porosity and defect density associated with the high energy method, the PGN anode may achieve a stabilized capacity above 1000 mAh/g at a rate of 1 C in less than 100 cycles, more preferably, less than 10 cycles of operation, and it may be possible to provide a fully lithiated anode in less than a week, preferably less than one day.

Following lithiation, the anodes have been converted into cathodes and may be disassembled in a completely lithiated state inside a glove box, and their mass recorded in a microgram weighing balance. "Completely lithiated" as used herein means that the lithiated PGN should measure about zero volts in a half-cell configuration with a pure lithium foil as the counter electrode or between 2 to 3 V against carbon counter electrode. The lithiated PGN may then be reassembled into a cathodic half-cell. The mass loading of the cathode may be 0.1 to 5 mg/cm$^2$, preferably at least 1 mg/cm$^2$, which is comparable to the industrial standard for commercial lithium ion batteries. Current industrial scale manufacturing of conventional electrode materials of lithium ion batteries is a lengthy process, taking up to three weeks at times from material processing to cell assembly. The present method therefore offers a viable alternative to significantly reduce manufacturing time because cathode fabrication processes according to various embodiments of the present invention may take less than a day for full lithiation.

Referring now to the various figures, FIG. 1(A) compares the capacity and coulombic efficiency vs. cycle index of a PGN anode made according to the present invention with the theoretical and practical capacity of graphitic anodes. As illustrated in FIG. 1A, a PGN anode made according to the present invention may exhibit a maximum specific capacity of approximately 915 mAh/g (about 2.5 times higher than the theoretical capacity of graphite), with coulombic efficiencies above 99%. While not wishing to be bound to theory, the reason why such porous graphene electrodes deliver capacities that are almost 3-fold higher than conventional electrodes and that are stable over 1000 charge/discharge cycles may be attributed to the defect induced electroplating of lithium metal within the porous graphene network. Due to the electroplating and other intercalation reactions, a PGN anode may undergo expansion, thereby generating new defects. As additional defects are induced due to the repeated lithiation-delithiation cycles, these regions may serve as new seed points for electroplating of additional lithium. This in turn may cause the expansion of the porous graphene network as the lithium pushes against the graphene enclosing it. Thus, it is likely that both the defect generation and expansion of pores in the graphene network are responsible for the improvement in capacity.

Figure 1B:
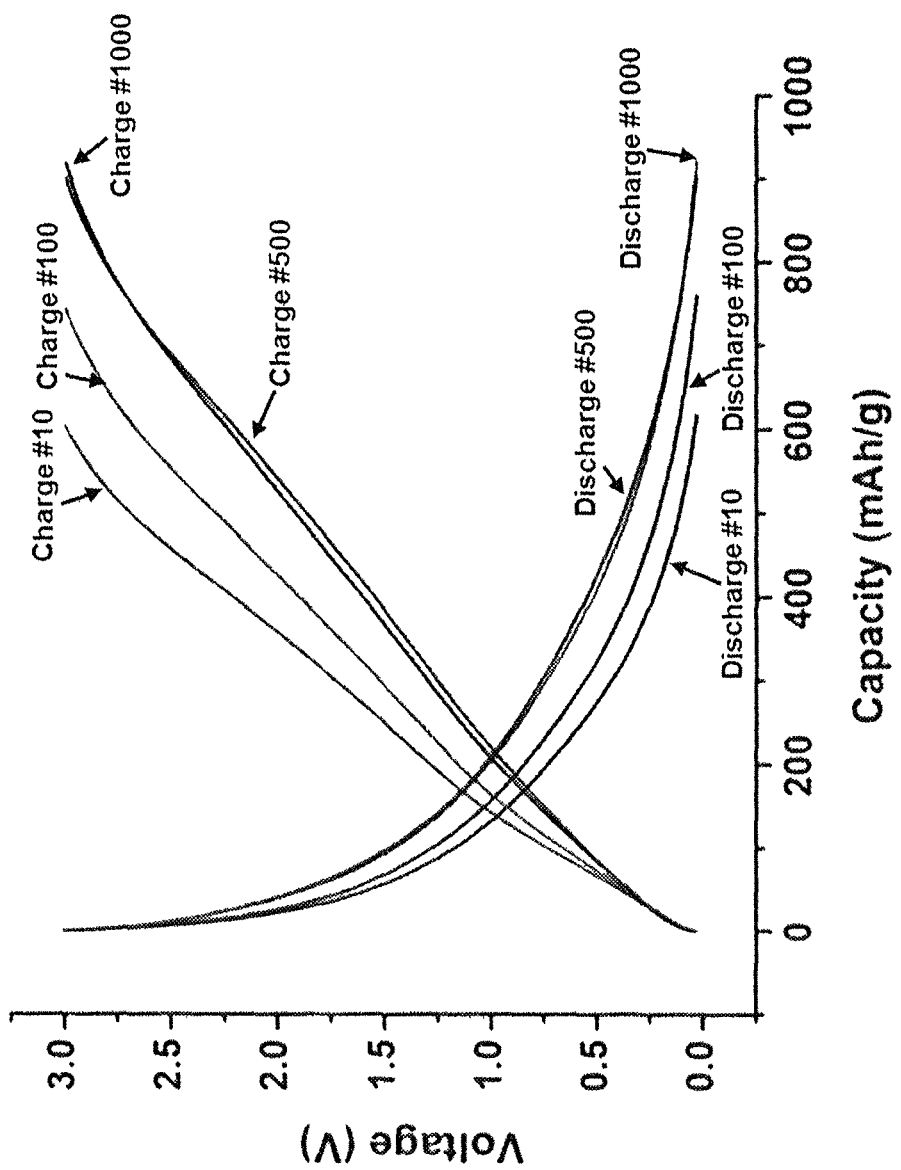
FIG. 1(B) is the voltage profile of an anode according to an embodiment of the present invention.
Figure 1C:
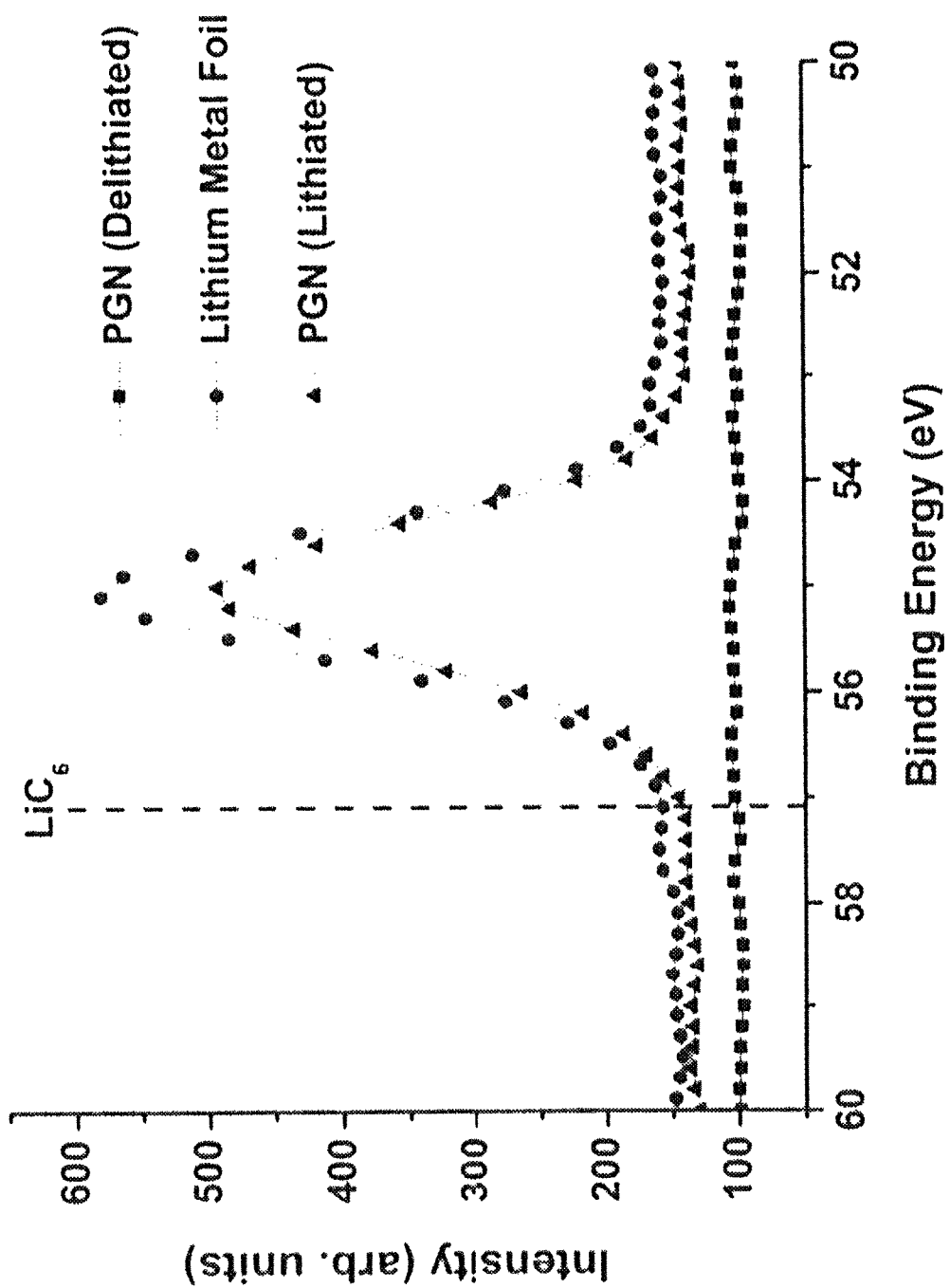
FIG. 1(C) is an X-ray Photoelectron Spectroscopy (XPS) Li 1 s scan of a lithiated and delithiated electrode according to an embodiment of the present invention and a bare lithium metal foil.

In order to test this assertion, the surface chemistry of a fully lithiated PGN electrode made according to the present invention was studied (after the 1000th cycle) using X-Ray Photoelectron Spectroscopy (XPS) Li 1 s scans and compared to a completely delithiated PGN electrode (after the 300th cycle) along with a bare lithium metal foil as the control. Referring to FIG. 1(C), a strong lithium metal peak was observed in the lithiated sample indicating the presence of pure metal within the PGN electrode. The strong lithium metal peak matches the signature from the metallic lithium foil, the conventional intercalation state in graphitic anodes. On the other hand, the delithiated PGN sample, as expected, did not show the presence of any lithium metal, indicating excellent reversibility. In addition it should be noted that the peak for standard graphite intercalated state of $LiC_6$[17] was not detected in the lithiated sample as well. This suggests that the reaction mechanism in PGN electrodes is not standard graphite intercalation chemistry. This is surprising since the voltage profile in FIG. 1(B) clearly indicates intercalation. As illustrated in FIG. 1(B), the voltage profile of the PGN anode indicates intercalation profiles with a steady drop in capacity below 0.5V (the intercalation potential of lithium ions in carbon).

Figure 1D:
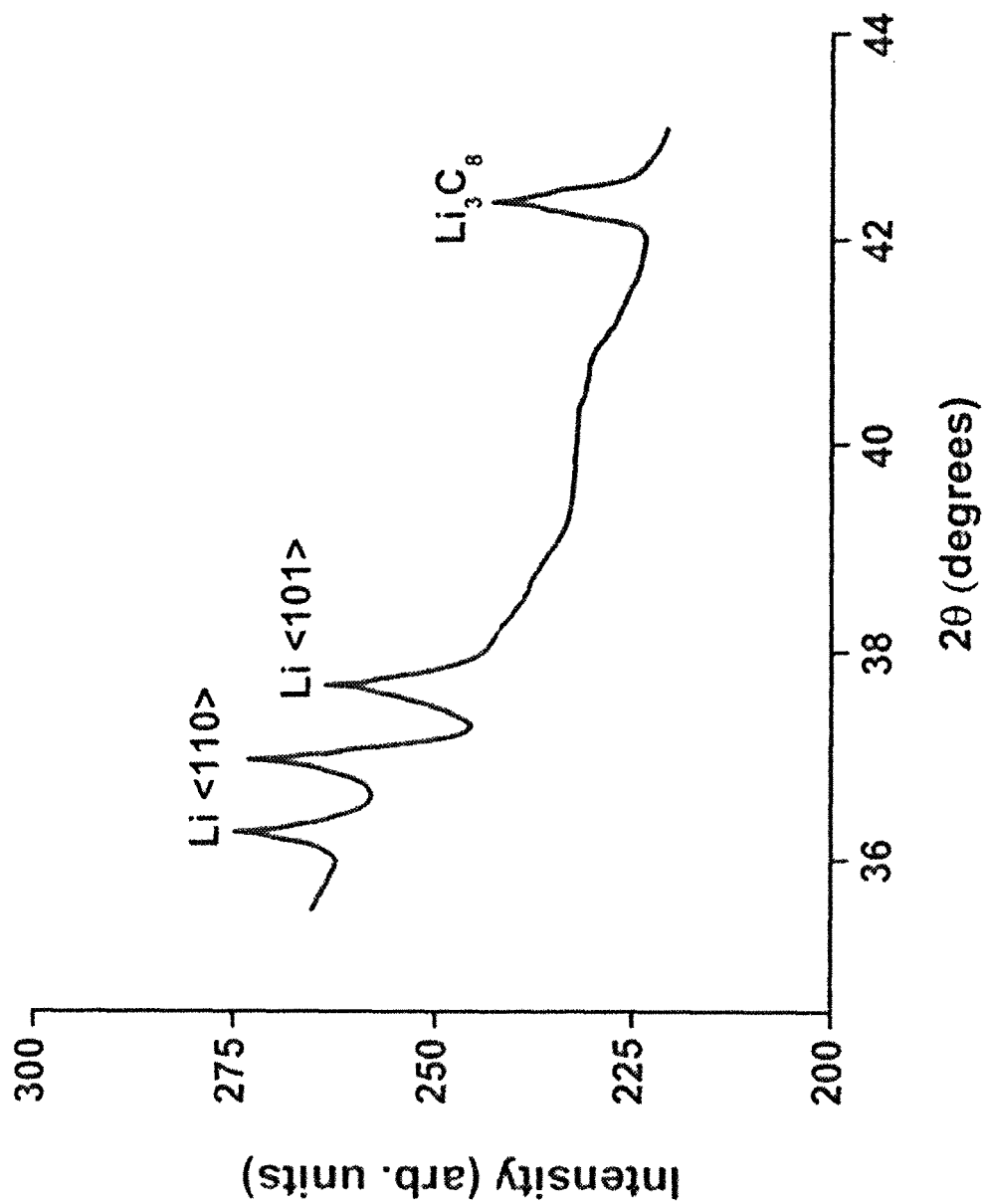
FIG. 1(D) is an X-Ray Diffraction (XRD) profile of a lithiated electrode according to an embodiment of the present invention.

To further investigate the intercalated states, X-ray Diffraction (XRD) measurements were carried out on a completely lithiated graphene anode made according to the present invention. Referring to the XRD profile of the lithiated PGN sample in FIG. 1(D), prominent lithium metal peaks corresponding to <110> and <101> crystal planes along with a peak for $Li_3C_8$ occur indicating the presence of pure lithium metal. Moreover a strong peak for $Li_3C_8$ was also observed. The lithium-to-carbon ratio in an intercalated state observed for the graphene anode material was surprisingly high as compared to the lithium-to-carbon ratio observed in traditional graphitic anodes, while commercial graphitic anodes exhibit a lithium-to-carbon ratio of 1:6 (corresponding to the formation of $LiC_6$), the graphene anodes exhibit a lithium-to-carbon ratio of 3:8 (corresponding to the formation of $Li_3C_8$).

The formation of $Li_3C_8$ by itself can provide a theoretical capacity of 837 mAh/g, thereby competing closely with other high performance non-carbonaceous anodes such as silicon (4200 mAh/g), germanium (1600 mAh/g), and tin oxide (1491 mAh/g). While the formation of $Li_3C_8$ is consistent with the intercalation chemistry observed in the voltage profile of FIG. 1(B), the presence of $Li_3C_8$ does not fully explain how the participation of lithium metal in the anode contributes to the high reversible capacity that exceeds the theoretical maximum for a graphitic anode observed in FIG. 1(A).

Further investigation of the mechanisms associated with the cathode and anode material made according to the present invention was performed using theoretical modeling and image analysis. To understand the formation of $Li_3C_8$, the presence of defects in the graphene lattice were investigated and their participation in lithium ion interaction. The existence of a variety of structural defects in graphene is known. While Stone-Wales defects, defects generated by pure reconstruction of a graphene lattice into non-hexagonal forms, are less likely to form in thermally reduced graphene oxide due to a high formation energy required for the incorporation of such a defect, the existence of vacancies is far more likely. Vacancies are primarily of two types—single vacancy and multiple vacancy. However, a single vacancy, arising from a missing lattice atom, is generally less stable owing to the presence of dangling bonds. A divacancy on the other hand is much more thermodynamically favorable over single vacancies and would thus be more likely to exist. There is some experimental research supporting the conclusion that divacancy defects are highly prevalent in graphene oxide sheets reduced by a thermal shock method.

Figure 2A:
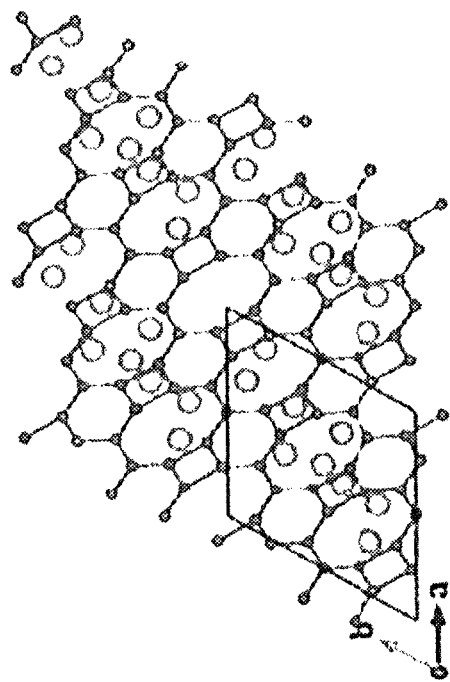
FIG. 2(A) is a model of a graphene lattice having 25% divacancy defects.
Figure 2B:
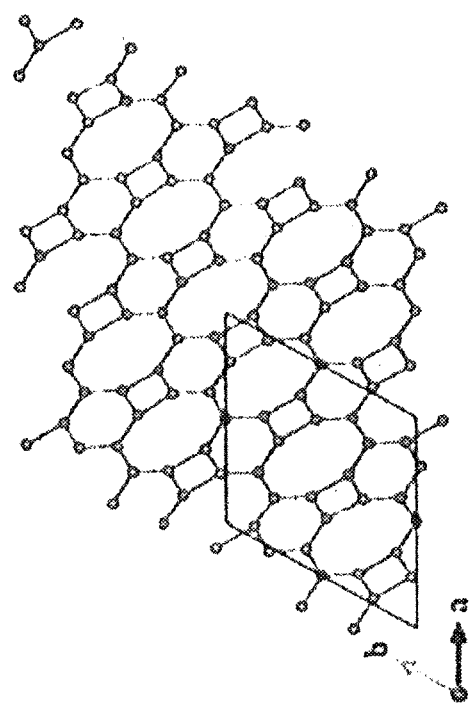
FIG. 2(B) is a model of the lattice of FIG. 2(A) including lithium metal.

To understand the role of divacancy defects, density functional theory (DFT) calculations were performed to model lithium interaction with graphene using the Vienna Ab initio Simulation Package (VASP), software distributed by University of Vienna, Austria. Models incorporating divacancy (DV) defects were generated by removing a C—C dimer from perfect graphene structures, as illustrated in FIGS. 2(A) and 2(B). Based on this model, the potential for lithium adsorption was evaluated in three different locations: center of defect, adjacent to the defect, and far from the defect. The lithiation potential was subsequently found to be the highest (0.7415 eV) at the center of defect while dropping to about half (0.3658 eV) at the location farthest from the defect, indicating that the defective zone was the most favorable site for lithium adsorption.

Figure 2C:
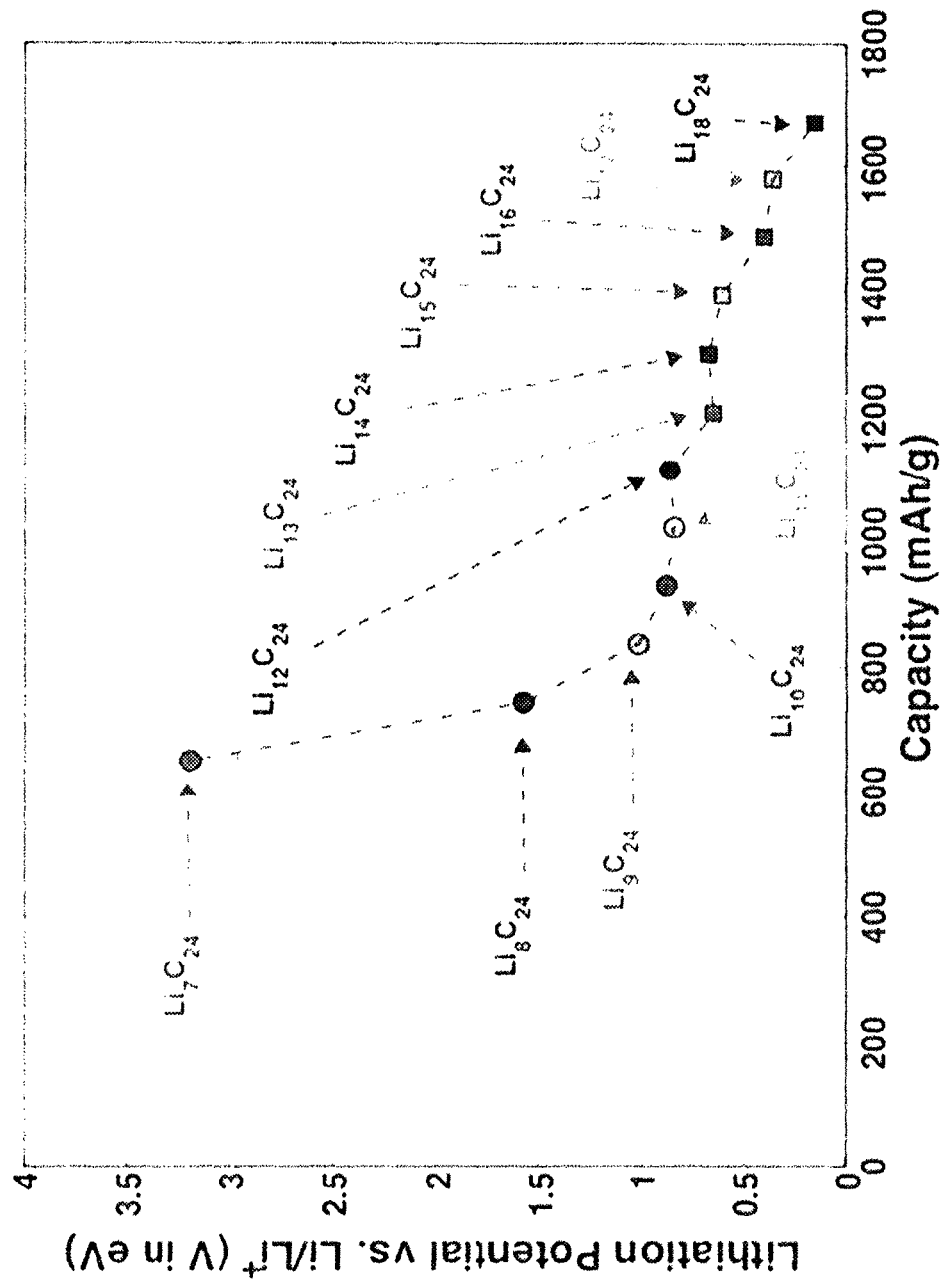
FIG. 2(C) is the calculated capacity (mAh/g) vs. lithiation potential (eV) for graphene at various divacancy defect densities.

Five different percentages of DV defects (6.25%, 12.50%, 16%, 18.75% and 25%) were then assumed and the prospective nature of their intercalation with lithium atoms was compared to the experimentally obtained observation of $Li_3C_8$ formation. For each percentage of defects, DFT calculations were carried out for different lithium concentrations until the maximum limit for capacity was obtained, i.e. when a negative lithiation potential was reached. When lithium is distributed on and around the defective sites, the tendency for adsorption was found to increase significantly. For instance, for a 12.5% DV defect density, the maximum capacity is about 400 mAh/g with potential around 0.05 eV. As the defect density increased, the maximum capacity was also found to increase. For example, a 16% DV defect density contributed towards a capacity of about 585 mAh/g with a potential range of 1-1.5 eV. For a DV defect density of 25%, the maximum capacity was as high as 1675 mAh/g, corresponding to a lithiation potential of 0.1 eV, as illustrated in FIG. 2(C).

Interestingly, the presence of 25% DV defects was found to induce the formation of $Li_3C_8$ (as illustrated in FIG. 2(B)) at a relatively large potential of 0.84 eV, corresponding to a maximum capacity of 837 mAh/g. The favorable formation of $Li_3C_8$, as obtained through DFT calculations, coupled with the observation of an XRD peak corresponding to $Li_3C_8$ in a fully lithiated graphene sample, suggests the formation of $Li_3C_8$. Based on these results, lithium may adsorb strongly to DV defects in stable configurations of graphene, and such $Li_3C_8$ clusters formed in the vicinity of DV defects may act as seed points for subsequent plating of lithium metal.

In general, lithium metal plating has been observed on the exposed (outer) surfaces of graphitic anodes batteries due to the closeness of the reversible potential to the deposition potential of metallic lithium. However, such plating has only been commonly found under operational parameters involving a combination of high charge/discharge rates and low temperature. At high rates, lithium intercalation kinetics is impeded by slow diffusion of lithium ions and instead lithium metal plating tends to be more favorable. On the other hand, at low operational temperatures, battery electrolytes lose their ionic mobility, further affecting lithium diffusion and intercalation also promoting plating of metallic lithium. Although plated lithium metal is largely reversible, there is still some, residual metallic lithium that tends to react with the electrolyte in subsequent charge cycles thereby deteriorating the electrode-electrolyte interface and resulting in a loss of active lithium. Over extended cycling, this problem can lead to serious issues with respect to capacity fade. Another significant drawback of lithium metal plating is its tendency to give rise to dendritic growths. Dendritic growths are preferentially formed at defects and metallic imperfections, such as cracks or stress lines, present on the plated lithium owing to enhancement of local current density at these sites. Such dendritic growths may over extend cycling and lead to hazardous shorting in lithium ion batteries.

However, the phenomenon of on-set of plating on the anodes of batteries incorporating the materials of the present invention is significantly different from those observed in current state-of-the-art batteries. As mentioned before, the intercalation and formation of $Li_3C_8$ at DV defects act as seed points for subsequent lithium metal plating owing to variation of local current densities at these sites. However, as opposed to lithium metal plating on anode surfaces, the lithium metal is trapped within the nano pores of the PGN. As more and more lithium metal gets plated, the nano pores are filled. In addition to trapping metallic lithium, the PGN also prevents dendritic lithium from projecting out of the anodic surface and thereby, successfully preventing any potential shorts between the anode and cathode.

Figure 3A:
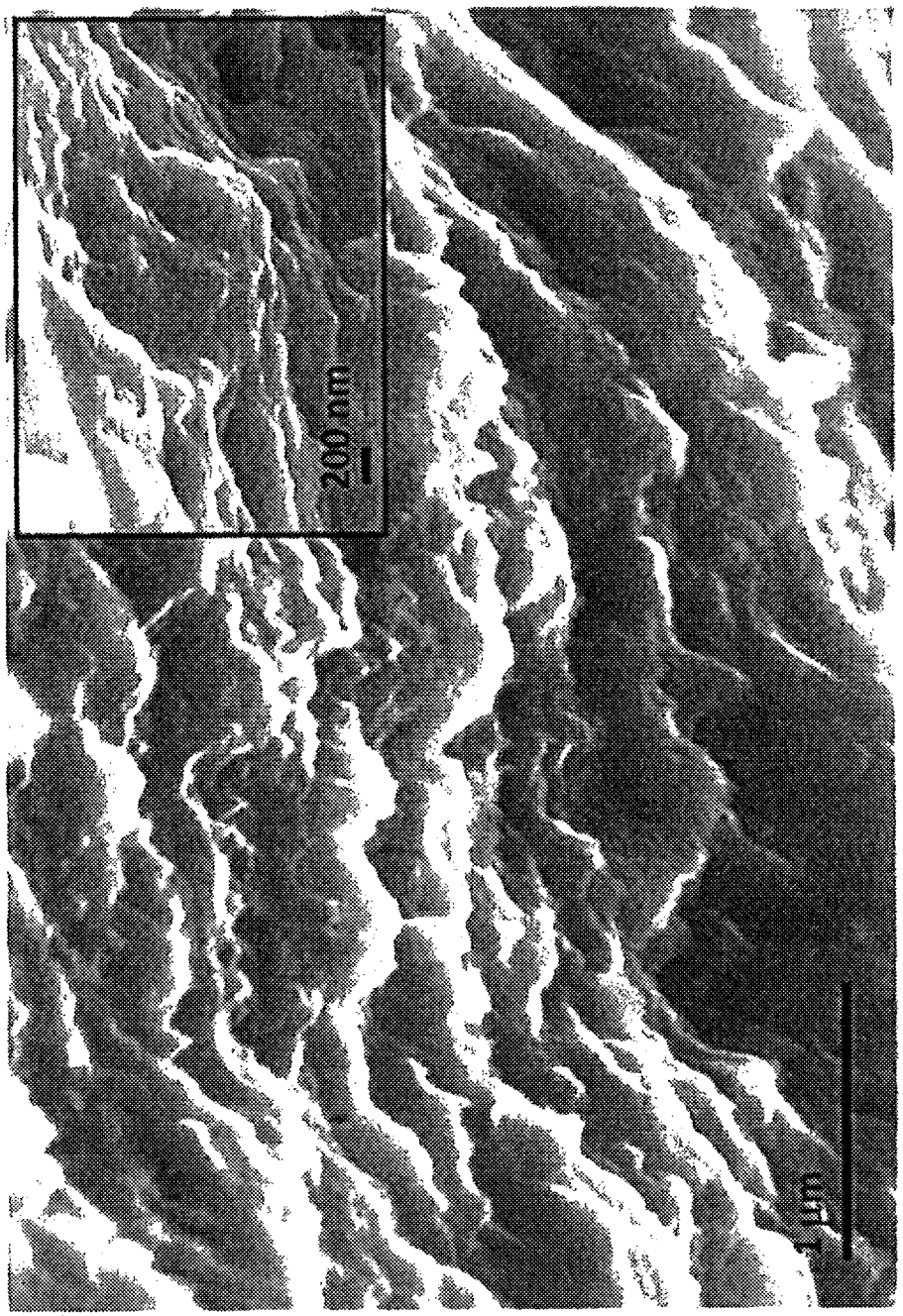
FIG. 3(A) is a cross-section Scanning Electron Microscopy (SEM) image of a completely lithiated electrode according to an embodiment of the present invention.
Figure 3B:
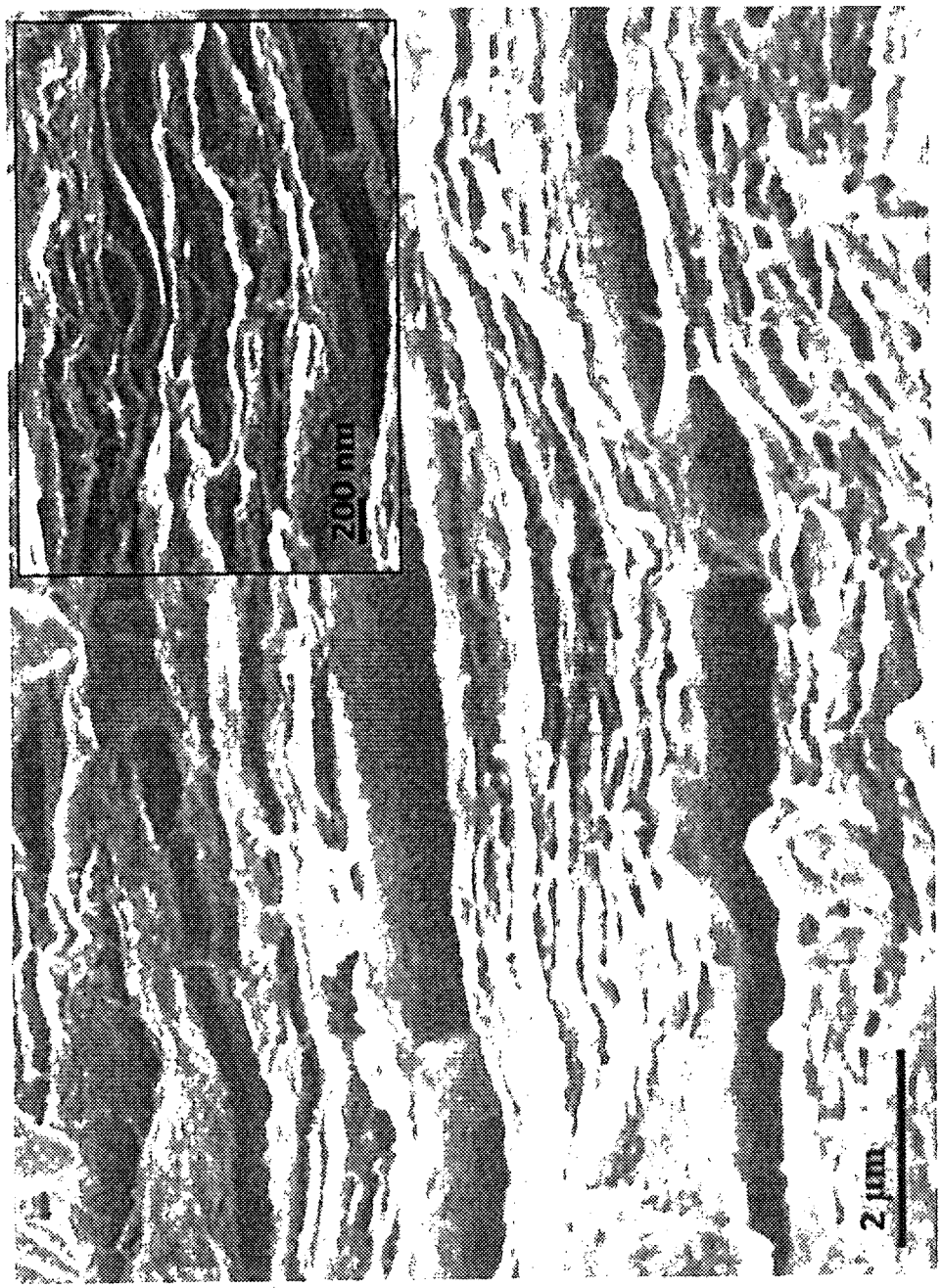
FIG. 3(B) is a cross-section SEM image of a completely delithiated electrode according to an embodiment of the present invention.

In order to confirm the participation of the nano pores in trapping lithium metal, scanning electron microscopy (SEM) images of PGN anodes were obtained under completely lithiated and delithiated conditions. FIG. 3A shows the cross section of a PGN anode according to the present invention in a completely lithiated state (after the 1000th charge/discharge cycle). As is clearly visible, the pores are entirely filled up with lithium metal. Interestingly, no dendritic formations can be seen projecting out of the structure, even after 1000 charge/discharge cycles thereby allowing for operational safety. The inset shows a magnified image of the cross-section. The reversibility of plated lithium and its ability to delithiate in the subsequent charge cycle can clearly be seen in FIG. 3B whereby the cross-section of a PGN anode is shown under a completely delithiated state (after the 300th charge/discharge cycle). The pores are seen to open up once again and are no longer filled with metallic lithium. The inset again shows a magnified image of the cross-section. Both these observations, along with the XPS profile of a completely delithiated sample showing the marked absence of lithium metal in FIG. 1(C), demonstrate two features of the electrodes made according to the present invention associated with the plating of lithium metal: (1) the plated lithium metal is trapped and enclosed within the porous graphene network and is hence free from potential shorting and (2) the plating is highly reversible and does not tend to deteriorate the electrode-electrolyte interface, contribute towards dendritic growth, or add to loss of active lithium. These observations are further confirmed by the excellent cycle life of over 1000 charge/discharge steps, with a coulombic efficiency as high as 99% illustrated in FIG. 1(A), thereby indicating impressive reversibility.

The steady rise in capacity observed over the first 300 cycles in FIG. 1(A) may also be explained by the occurrence of lithium metal plating. During the first phase of cycling, the PGN anode may undergo volume expansion, as is observed in most graphitic anodes. This in turn may cause the pores within PGN anode to open up, thereby increasing its ability to store more metallic lithium and hence increasing the capacity with cycling. In addition, electrolytic access to all the DV defect sites might be limited during initial cycling owing to wettability characteristics of the PGN anode. As the cell is cycled, electrolyte wettability may be enhanced and more defect sites are exposed for intercalation and subsequent plating reactions, further contributing to the rising capacity. This phenomenon may continue until an equilibration stage is reached whereby the pores have completely opened up and the electrolyte completely wets the PGN anode. This is identified as the second phase of cycling (300th cycle onwards) where a steady capacity of about 915 mAh/g is reached and is sustained throughout subsequent cycling.

According to another embodiment of the present invention, an "all-carbon" battery is provided comprising a composite cathode including lithium metal within a PGN and a PGN anode. Lithium metal offers the highest theoretical capacity (3842 mAh/g) in lithium ion batteries, and a cathode material comprising lithium metal would thus be most suitable for next generation high energy density batteries. Further, the use of such a composite cathode would enable the use of high capacity anodes, such as graphene, silicon, germanium, and tin oxide, without having to add excessive cathodic mass to match the capacity of the anode, thereby simplifying the choice of electrodes significantly.

Figure 4A:
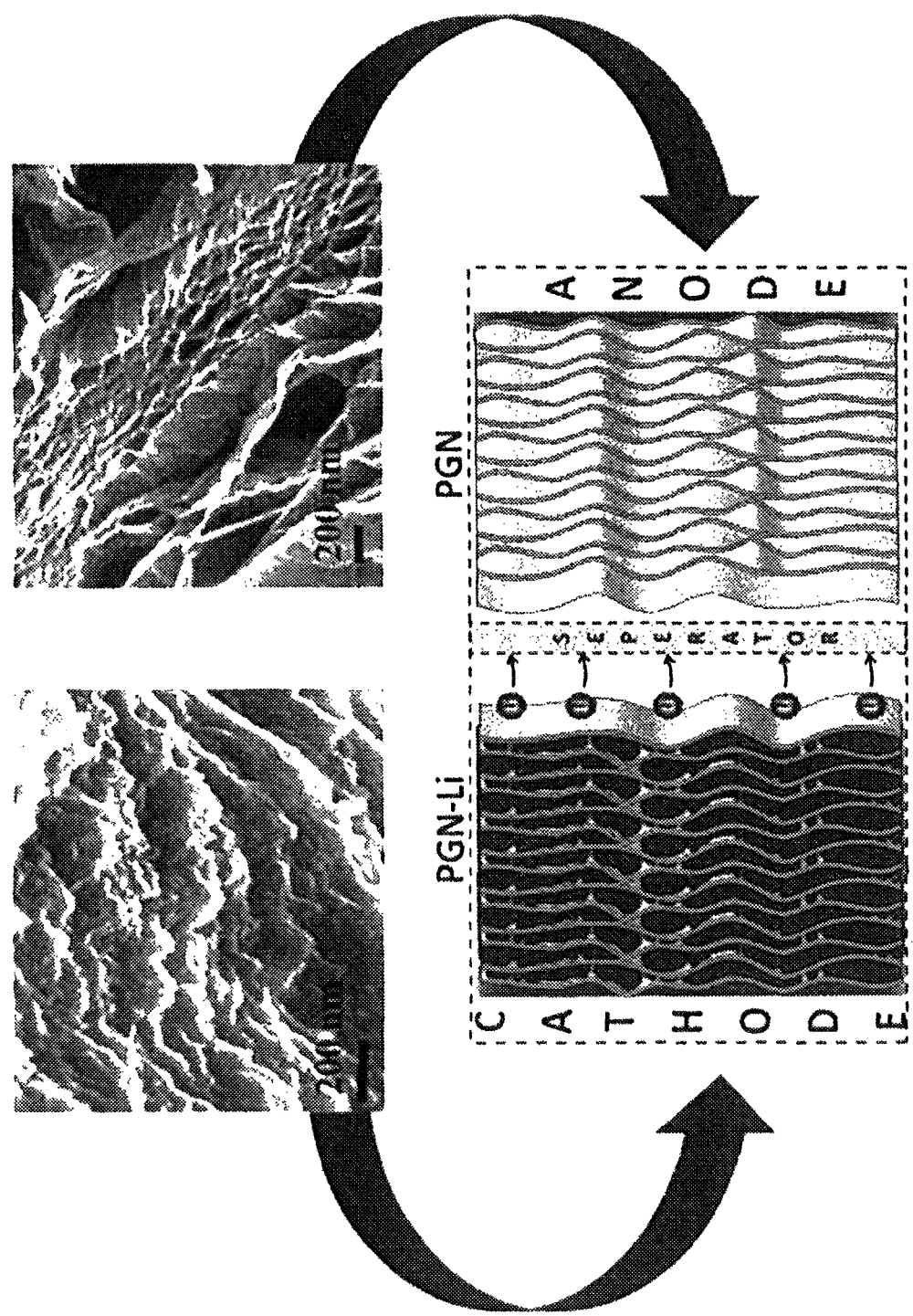
FIG. 4(A) is a schematic of a full cell configuration including a lithium/PGN composite as cathode and a PGN as an anode according to an embodiment of the invention.
Figure 4B:
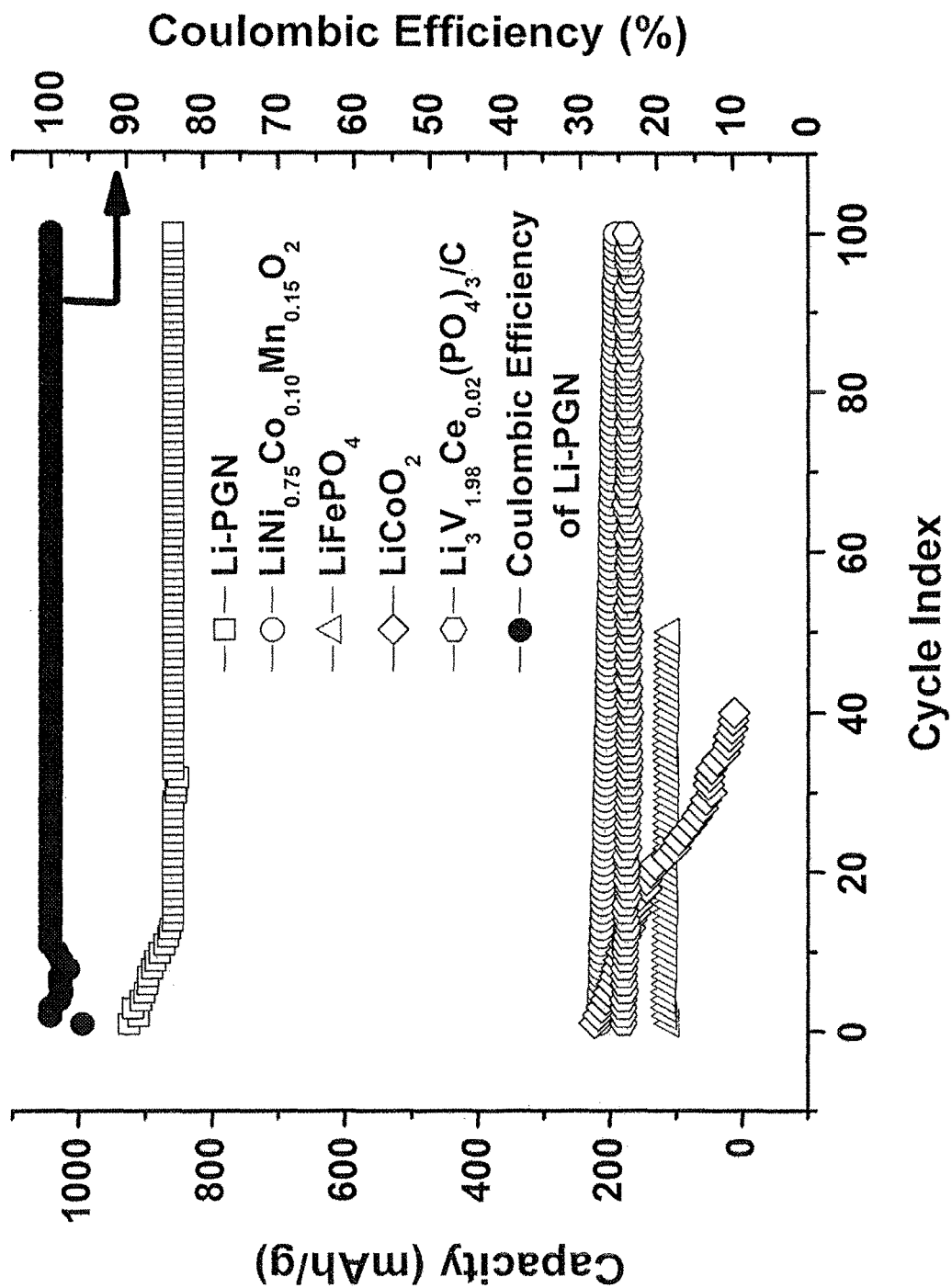
FIG. 4(B) is the capacity and coulombic efficiency vs. cycle index of lithium/PGN cathodes at a charge/discharge rate of ~1 C (current density of ~0.3 A/g) compared to various cathode materials measured at comparable current densities.
Figure 4C:
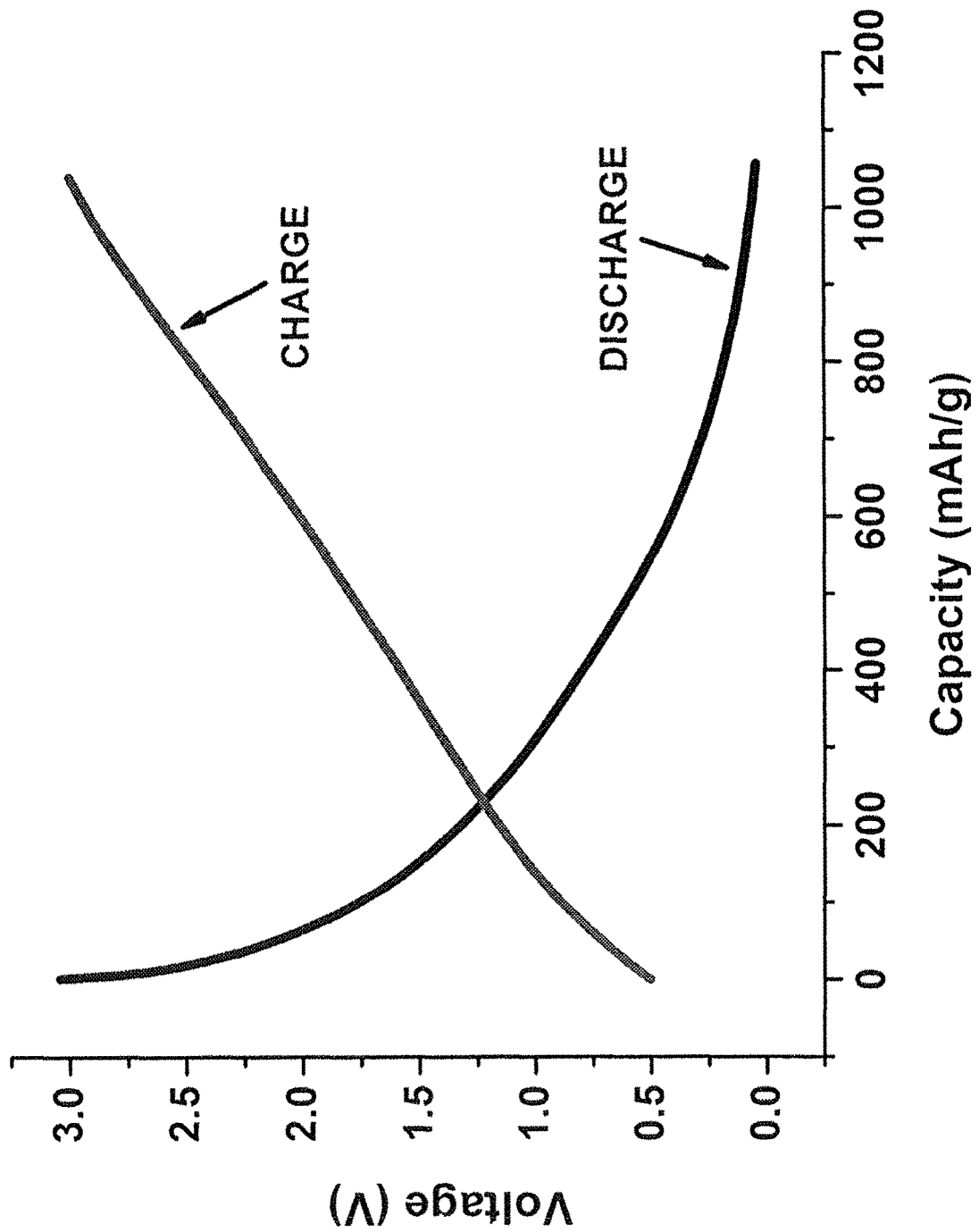
FIG. 4(C) is a voltage profile of a cathodic half-cell according to an embodiment of the present invention.

A lithiated PGN cathode and a PGN anode may be prepared according to the synthesis processes of the present invention described above and combined to provide a full cell configuration. Such a configuration is shown schematically in FIG. 4(A). The cathodic half-cell may also include lithium metal foil (not shown in the schematic) as a counter electrode. In one example of the present invention, a cathodic half-cell was cycled at constant current densities of approximately 300 mA/g and a specific capacity in excess of 800 mAh/g (based on the total mass of lithium+PGN) was observed, stable over 100 cycles, corresponding to an energy density of approximately 600 Wh/kg and a power density of 300 W/kg. The voltage profile of the half-cell demonstrated smooth lithiation and delithiation profiles, as shown in FIG. 4(C), indicating an efficient lithiation-delithiation process. By contrast, the practically realizable capacities and energy densities for $LiMnO_2$, $LiFePO_4$, and $LiCoO_2$ cathodes lie in the 100-150 mAh/g and 110-180 Wh/Kg range, respectively. A comparison of the specific capacities and coulombic efficiency vs. cycle index of a lithiated PGN cathode at a charge/discharge rate of approximately 1 C (current density of about 0.3 A/g) and conventional cathode materials measured at comparable current densities has been provided in FIG. 4(B).

Figure 4D:
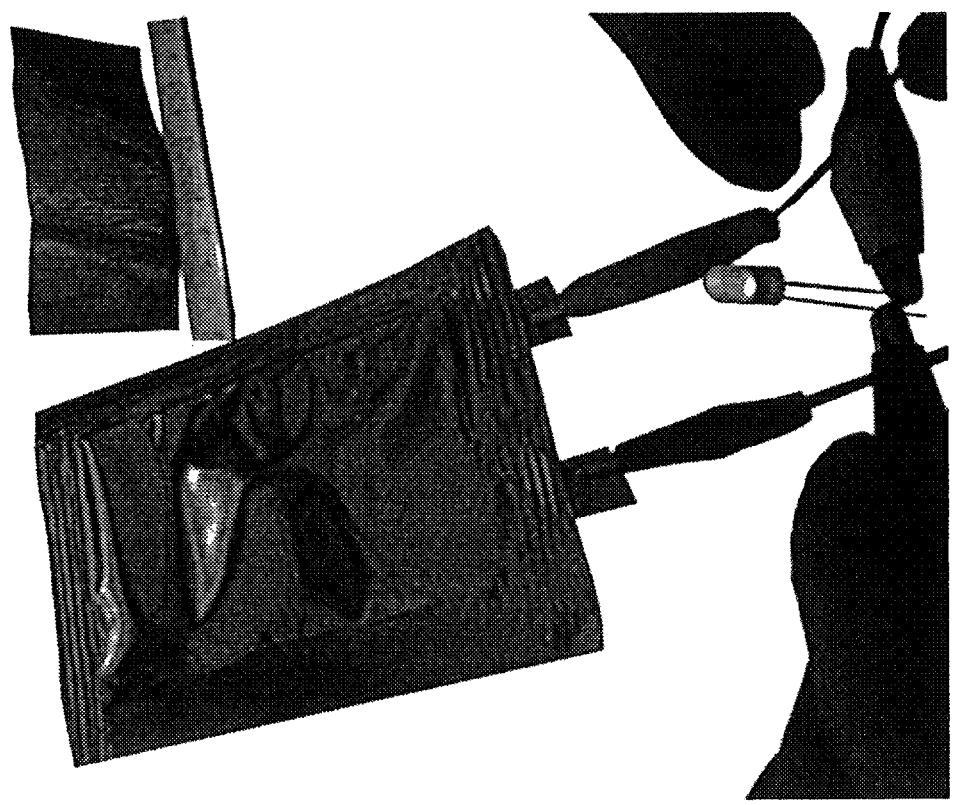
FIG. 4(D) is a photograph of an LED device powered by a macroscopic pouch cell containing a PN anode and Li-PGN cathode according to an embodiment of the invention.

To demonstrate the versatility and scalability of the PGNs according to the present invention, a full-cell was assembled in a pouch cell configuration. A photograph of the full cell is provided in FIG. 4(D). The full cell included PGN anodes and lithiated PGN cathodes, stacked to provide an ampere-hour rating of about 18 mAh. The inset in FIG. 4(D) shows a photograph of a free-standing graphene oxide paper with an area of about 30 $cm^2$ and a thickness of about 100 microns. This graphene oxide paper was cut into electrodes (about 5 $cm^2$ in area) and reduced using either a xenon flash (Einstein E640, energy—320 Ws) or convective heat. These individual electrodes were then used to construct the pouch cell stack and demonstrated a mass loading of about 2.5 mg/$cm^2$, well within the industrial standards of 1-5 mg/$cm^2$. The pouch cell was successfully used to power an LED device, as shown in the photograph. This particular pouch cell comprised of a stack of three full cells. Adding more cells to the stack or increasing the area of each cell would increase the ampere-hour rating of the battery. Such a battery is unique in that it utilizes "all-carbon" electrodes as both the anode and the cathode. The only source of lithium in this device may be the lithium metal that was stored within the pores of the PGN cathode structure.

Thus, according to various embodiments of the present invention, a metallic lithium/graphene composite is provided as a safe, viable and high-performance cathode for lithium ion batteries. The capacity obtained may be over 5-fold higher than conventional cathodes owing to the presence of metallic lithium. Graphene in the composite cathode may not only trap lithium metal, but also provide a conductive network for efficient electron transfer, thereby offering a significant improvement over other conventional less-conductive cathodes, such as $LiFePO_4$, that often require additional doping. Furthermore, the use of light-weight graphene and lithium may provide high gravimetric capacity and energy density. The successful demonstration of a pouch cell (in a full-cell configuration) with PGN anodes and Li-PGN cathodes indicates the feasibility of an all-carbon lithium battery. Such a configuration can reduce cost, offer superior energy density and cycle stability while also significantly simplifying the battery chemistry. Finally, the assembly and demonstration of a pouch cell indicates the feasibility of scale-up, which is a concern for nanostructured electrodes that often lack sufficient active mass to build a viable battery. The lack of environmentally hazardous waste materials (e.g. Co) in such designs could lead to a new class of high-performing and environmentally friendly battery technologies.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The invention claimed is:

1. A system for the production of graphene sheets comprising:
   a counter electrode and a working electrode immersed in a bath, the bath containing a dispersion of graphene oxide,
   a membrane applied to a surface of the counter electrode,
   a source of electricity configured to apply a current between the counter electrode and the working electrode capable of electrolytically depositing the graphene oxide in the bath onto the membrane; and
   a reduction zone downstream of the bath configured to reduce the graphene oxide to graphene, the reduction zone comprising a light source configured to emit flashes having an energy intensity of about 150 Ws to about 400 Ws.

2. The system of claim 1, wherein the membrane comprises a hydrophilic porous polymer.

3. The system of claim 1, wherein the membrane is configured to be removable from the bath following deposition of the graphene oxide.

4. The system of claim 1, further comprising a plurality of rollers configured to advance the membrane through the bath and wherein the membrane is in the form of a web provided on at least one of the plurality of rollers.

5. The system of claim 4 further comprising a drying zone downstream of the bath and configured to dry the graphene oxide deposited on the membrane.

6. The system of claim 4 wherein the membrane is configured to be separated from the graphene oxide and wound on one of the plurality of rollers between the drying zone and the reduction zone.

* * * * *